(12) United States Patent
Endo et al.

(10) Patent No.: US 6,630,890 B1
(45) Date of Patent: Oct. 7, 2003

(54) METHODS, SYSTEMS AND TOOLS FOR BOREHOLE LOGGING

(75) Inventors: Tatsuki Endo, Sagamihara (JP); David Mathison, Yokohama (JP); Jiro Takeda, Sagamihara (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 575 days.

(21) Appl. No.: 09/668,793

(22) Filed: Sep. 22, 2000

(51) Int. Cl.$^7$ .................................................. G01V 3/00
(52) U.S. Cl. ............................... 340/853.9; 340/855.6; 367/117; 367/34; 367/5; 181/122
(58) Field of Search ......................... 340/853.9, 855.5, 340/855.6; 367/5, 34, 117; 181/122

(56) References Cited

U.S. PATENT DOCUMENTS

| | | | |
|---|---|---|---|
| 4,684,947 A | * 8/1987 | Zimmer | 340/855.3 |
| 4,862,428 A | * 8/1989 | Jackett et al. | 367/155 |
| 4,901,289 A | 2/1990 | Cretin et al. | |
| 5,031,719 A | * 7/1991 | Baria et al. | 181/122 |
| 5,157,392 A | 10/1992 | Zimmer | |
| 5,191,326 A | 3/1993 | Montgomery | |
| 5,331,318 A | 7/1994 | Montgomery | |
| 5,585,556 A | 12/1996 | Petersen et al. | |
| 6,023,444 A | 2/2000 | Naville et al. | |

FOREIGN PATENT DOCUMENTS

| | | |
|---|---|---|
| EP | 0137724 | 9/1984 |
| EP | 0479543 | 9/1991 |
| EP | 0978733 | 8/1999 |

OTHER PUBLICATIONS

Bob A. Hardge, Crossswell Seismology & Reverse VSP, Seismic Applications vol. 1, Geophysical Press Ltd., London 1992, p. 139.

* cited by examiner

Primary Examiner—Michael Horabik
Assistant Examiner—Albert K. Wong
(74) Attorney, Agent, or Firm—Robin Nava; Brigitte Jeffery; John Ryberg (57) ABSTRACT

A borehole logging tool system includes a surface system, a logging array, and a logging cable providing power supply and data paths connecting the logging array to the surface system, wherein the logging array includes a series of discrete sondes connected together. The sondes in the logging array, for example a borehole seismic logging array, are connected to their neighbours by means of lengths of logging cable. Such cable can be the same as that connecting the logging array to the surface system. The logging array can also include a master controller module which communicates with the surface system and which includes a first controller module which connects to the surface system and a second controller which controls operation of the sondes in the logging array independently of any other borehole logging tools connected to the surface system. The master controller can include a data buffer for handling data from the array and a clock which can be synchronised with a clock at the surface and which can be used in the control of the sondes in the array. Adopting such an arrangement with a borehole seismic logging array allows the sondes to continue acquiring data continuously under control of the master controller module irrespective of the transmission of data to the surface by the telemetry system.

25 Claims, 6 Drawing Sheets

METHODS, SYSTEMS AND TOOLS FOR BOREHOLE LOGGING

FIELD OF THE INVENTION

The present invention relates to a borehole logging system and to a communication system for use in such logging systems. In particular, the invention concerns borehole logging systems which include a number of discrete logging sondes connected together to form an array, for example a borehole seismic array tool or to muliple measuring entities connected to form a string.

BACKGROUND OF THE INVENTION

In the logging of boreholes, one method of making measurements underground comprises connecting one or more tools to a cable connected to a surface system. The tools are then lowered into the borehole by means of the cable and then drawn back to the surface ("logged") through the borehole while making measurements. The conductors of the cable provide power to the tool from the surface and provide a route for electric signals to be passed between the tool and the surface system. These signals are for example, tool control signals which pass from the surface system to the tool, and tool operation signals and data which pass from the tool to the surface system.

Figure 1:
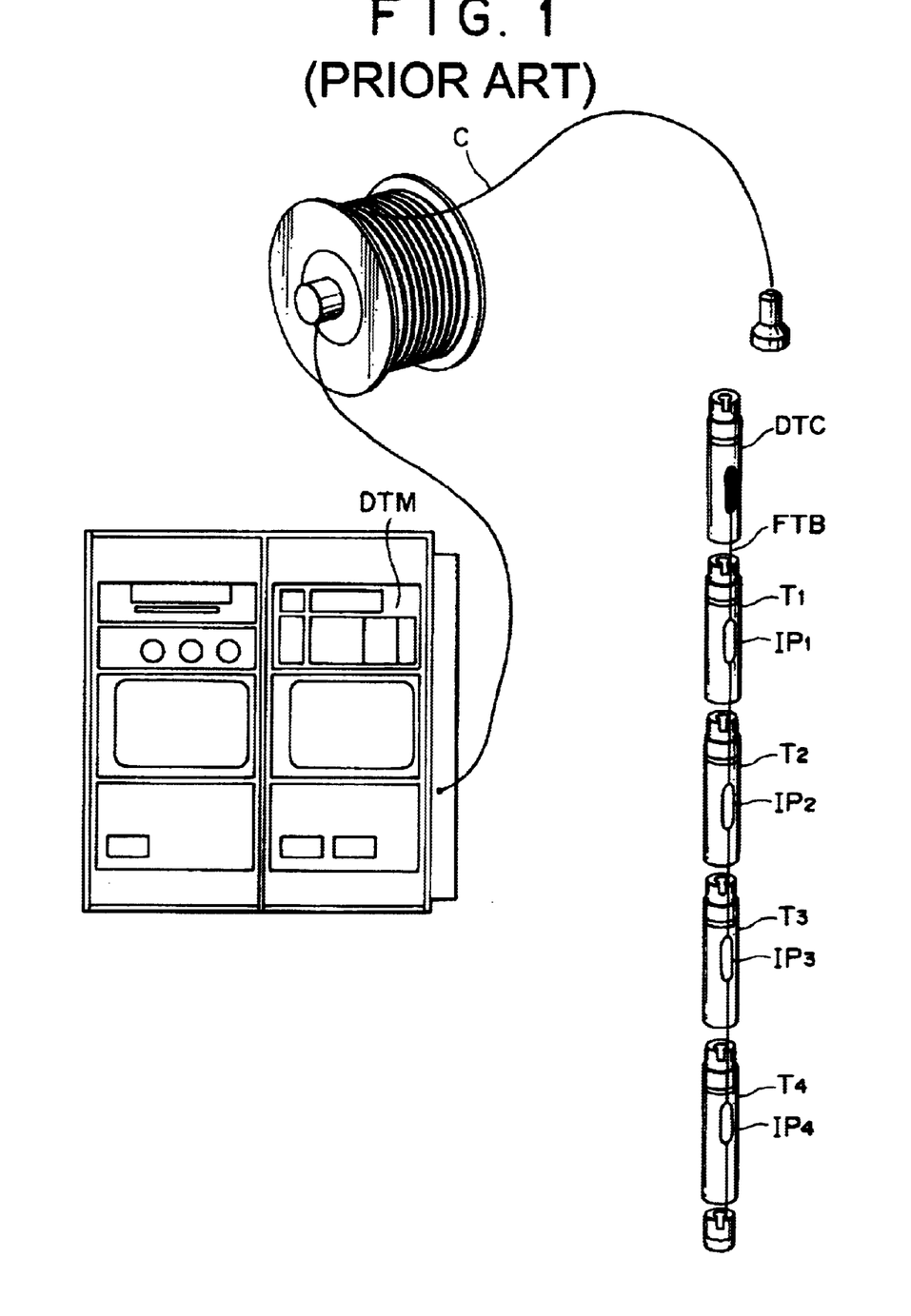
FIG. 1 shows a schematic view of a telemetry system for borehole use.

A schematic view of a prior art telemetry system for use in logging boreholes is shown in FIG. 1. The system shown comprises a digital telemetry module DTM which is typically located at the surface, a cable C, a downhole telemetry cartridge DTC at the head of a tool string which includes a number of downhole tools T1, T2, . . . each containing a respective interface package IP1, IP2, . . . through which they are in communication with the DTC via a fast tool bus FTB. This system is configured to handle data flows in opposite directions, i.e. from the tools, via the respective IPs and FTB, to the DTC and then to the DTM over the cable ("uplink"), and the reverse direction from the DTM to the DTC and tools over the same path ("downlink"). Since the principal object of the system is to provide a communication path from the tools to the surface so that data acquired by the tools in use can be processed and analysed at the surface, the protocol used favours the uplink at the cost of the downlink to optimise data flow from the tools. The communication path is split into two parts, the cable C and the tool bus FTB, and operation of these two are asynchronous to each other. In the FTB, the uplink and downlink both comprise biphase modulation using a half duplex systems of identical instantaneous data rate and frequency synchronised to a clock in the DTC. Both uplink and downlink are half duplex. A suitable protocol for implementing such a system is described in U.S. Pat. No. 5,191,326 and U.S. Pat. No. 5,331,318, the contents of which are incorporated herein by reference. The FTB signal path is typically constituted by a pair of coax cables or a twisted pair conductor running along the length of the tool string.

The tools T1, T2 . . . in the tool string are typically a series of sondes which make physical measurements of the formation surrounding the borehole, for example electrical, nuclear and acoustic measurements. The sondes are usually connected together to form a rigid tool string with electrical connectors permitting data and power connection between or through the sondes. In use, the operator must configure the FTB from the surface system to indicate the number of nodes (i.e. number of tools or sondes) such that the system can allocate addresses for each node. Once this is set, it is fixed and must be completely reconfigured to change the number of nodes.

Certain borehole tools are commonly found in the form of arrays, in which a number of similar (or identical) sondes which make the same measurement are connected together. Such an approach is often found in borehole seismic logging tools and examples can be found in SEISMIC APPLICATIONS Vol. 1, CROSSWELL SEISMOLOGY & REVERSE VSP by Bob A. Hardage, Geophysical Press Ltd., London 1992. Because of the necessity to couple the measurement sondes closely to the borehole wall in such cases in order to improve the acoustic detection ability, and the difficulty of achieving such coupling with a very long tool string, it is often proposed to join the sondes together with lengths of flexible cable, often called "bridles". The Array Seismic Imager ASI tool of Schlumberger, the SST 500 tool of CGG and other examples of such "array" or "multi-level" tools are found in U.S. Pat. No. 5,157,392.

One problem encountered with multi-level borehole seismic tools is that the large quantity of data recorded for each shot is greater than can be handled by current wireline telemetry systems. The tool described in U.S. Pat. No. 5,157,392 attempts to overcome this problem by providing memory in each sonde and in a downhole cartridge which is connected to the logging cable. In use, a signal is sent from a surface system to the cartridge to instruct activation of the measuring devices in each sonde for a predetermined time after the signal is received. This signal is coordinated with the firing of the surface source so that the sondes are active when the signal arrives. In order to overcome the limitations of the telemetry system, the sondes and the downhole cartridge are provided with buffers or memories which store the recorded signals. The stored signals are then telemetered to the surface over the logging cable when the sensors are not recording and when the tool is being moved in the borehole.

U.S. Pat. No. 5,585,556 describes a measurement while drilling system for making seismic measurements. In order to overcome the limitations of the telemetry system, signals are recorded downhole when drilling has stopped and a surface source is activated and stored. Some processing is performed on these signals and the processed data transmitted to the surface. The downhole tool must be retrieved in order to download all of the stored signals. In order to operate, the system is described as having synchronised clocks in the surface and downhole systems.

The systems described above have certain limitations. It is not possible to acquire data continuously and the surface system must be closely associated with the source firing system. This is often not possible, especially in marine environments. It is also not possible with this system to decide after the fact which data is to be telemetered to the surface and which can be discarded.

SUMMARY OF THE INVENTION

The present invention provides novel methods for recording data in borehole logging systems, novel borehole logging systems and novel borehole seismic logging tools and systems.

A method of recording data in a borehole logging system according to a first aspect of the invention comprises recording data at multiple measuring elements (such as seismic sensors) in a downhole system in a substantially continuous manner; storing the recorded data in a memory downhole; determining a data time window and a data sampling rate; and communicating, from the memory to the surface system, data falling in the determined time window and sampled at the determined sampling rate.

Preferably, time stamp data is associated with the recorded data in the memory. The time stamp data can be generated with a clock in the downhole system. In such a case, a synchronisation signal can be generated with a clock in the surface system, the synchronisation signal being sent to the downhole system and used to synchronise the clock in the downhole system with the clock in the surface system. The clock in the surface system can be synchronised with a time signal from a GPS system.

The time window and sampling rate can be communicated to the downhole system in a signal from the surface system. Alternatively, the time window and sampling rate can be determined in response to a detected event.

It is also convenient to transmit to the surface system data relating to the operating of the signal source which creates the signals sensed downhole.

The downhole system preferably includes a downhole telemetry cartridge and a sensor network cartridge, the recorded data being stored in the sensor network cartridge and the data being communicated to the surface via the downhole telemetry cartridge.

It is particularly preferred to assemble the downhole system at the surface and connecte it to the surface system and lower it into the borehole. By providing power to the downhole system, data can be recorded as the downhole system is lowered into the borehole.

A borehole logging system according to a second aspect of the invention comprises a surface system; and a downhole system, connected to the surface system, and including: a series of measuring elements; a memory; means for passing data from the measuring elements to the memory; and means for communicating data in a predetermined time window and at a predetermined sampling rate from the memory to the surface system.

A borehole seismic logging system according to a third aspect of the invention comprises a surface unit; a downhole seismic detector array connected to the surface unit and including a control module including a memory; and a series of shuttles, each of which has a sensor, the shuttles being connected to the control module and operating so as to record seismic signals and transmit data to the control module in a substantially continuous manner; wherein the control module communicates to the surface system data in a predetermined time window and at a predetermined sampling rate.

Preferably, the downhole system is connected to the surface system by means of a logging cable providing a power and data communication path.

The downhole array can further comprise a telemetry cartridge to which the control module is connected and via which it communicates with the surface system. Furthermore, the array can include a clock which provides time data to be associated with seismic signals recorded in the control module memory. The clock is preferably synchronised with a clock in the surface unit by means of control signals sent from the surface unit.

Where the system also includes a seismic source, the surface unit can receive time signals indicating operation of the source, the time signals being used to determine the time window and the sampling rate.

A borehole seismic logging tool according to a fourth aspect of the invention comprises a control module including a memory; and a series of shuttles, each of which includes a sensor and is connected to the control module such that, when supplied with power, it records seismic signal substantially continuously and transmits the recorded signals to the control module where they are recorded in the memory.

When the memory is full, it is preferred that new signals received from the shuttles are overwritten on old data already in the memory. The control module can also include a clock which provides time data to be associated with the recorded seismic signals. The control module preferably includes a first controller which can be connected to a surface system and a second controller which controls operation of the shuttles independently of any other borehole logging tools connected to the surface unit.

DESCRIPTION OF THE PREFERRED EMBODIMENT

Figure 2:
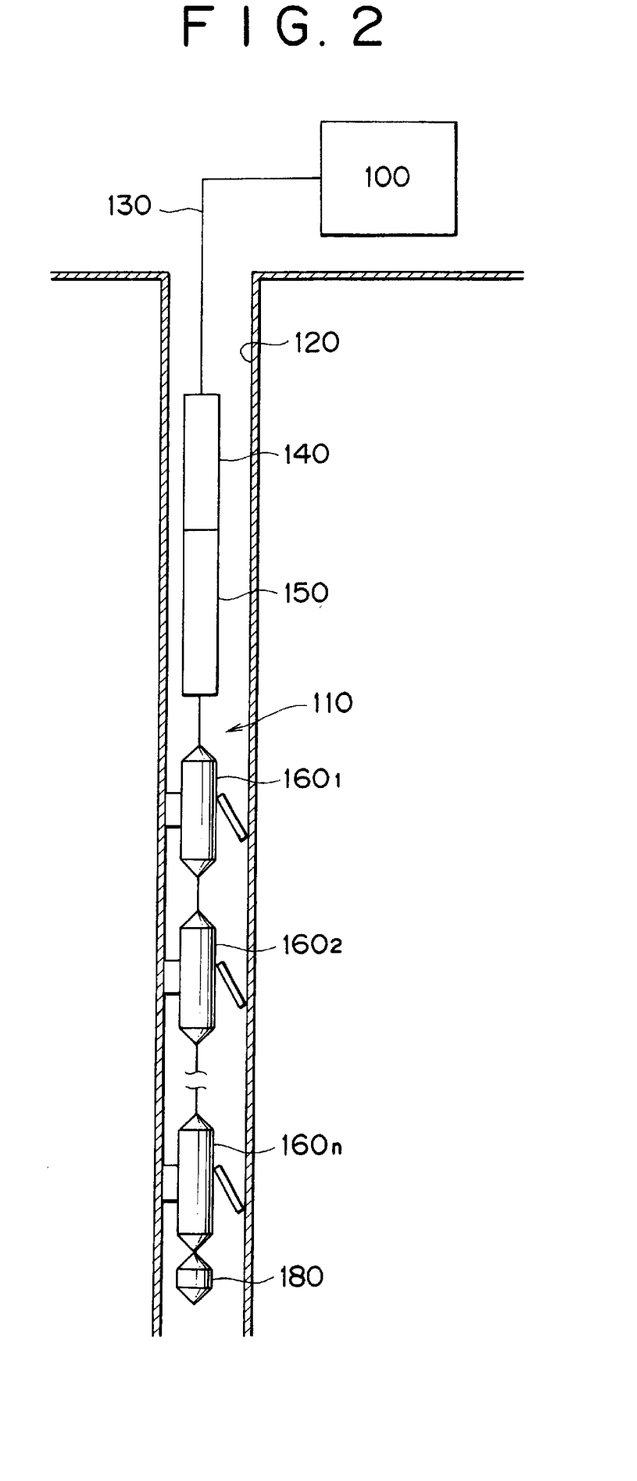
FIG. 2 shows a borehole seismic logging tool embodying an aspect of the invention.

The invention will be described in the context of a multi-shuttle borehole seismic logging tool as is shown schematically in FIG. 2. The tool comprises a surface unit 100 from which a tool string 110 is suspended in a borehole 120 by a conventional logging heptacable 130. The connection between the cable 13Q and the tool string 110 is provided by a downhole telemetry cartridge (DTC) 140 which communicates with the surface unit 100 in the manner described above in relation to FIG. 1. A tool cartridge 150 is connected below the telemetry cartridge 140. An array of tool shuttles $160_1, 160_2, \ldots, 160_n$, are connected to the tool cartridge 150, and an array terminator 180 is provided at the lower end of the array connected to the last shuttle $160_n$. Each shuttle 160 comprises a shuttle body 162, and anchoring arm 164 and a three-axis geophone package 166. The shuttles 160 are connected in an end to end arrangement with bridles 168 formed from logging heptacable. The number of shuttles in the array can vary from one to 20 depending on requirements. Also, other tool elements (sondes) can be connected to the downhole telemetry cartridge 140 above the tool cartridge 150.

Figure 3:
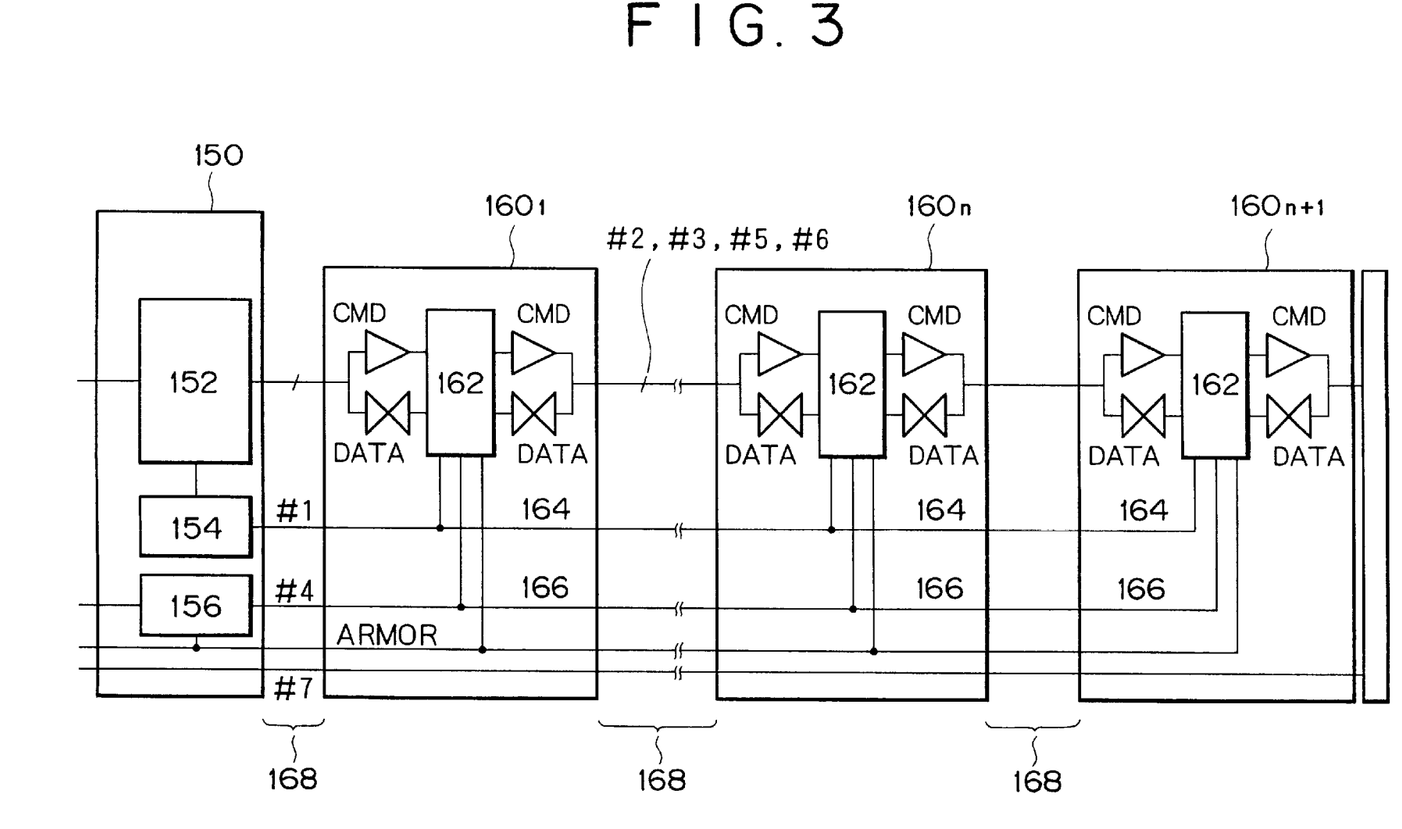
FIG. 3 shows the network topology of the tool of FIG. 2.

The tool cartridge 150 and the shuttles 160 define a network, the topology of which is schematically shown in FIG. 3. The connections between the cartridge 150 and the first shuttle 160, and between adjacent shuttles $160_n, 160_{n+1}$ is provided by heptacable bridles 168. The cable has eight electrically conducting paths, conductors #1 –#7 and the armour. The cartridge 150 includes a controller module 152 which communicates with the telemetry system via an interface package such as those found in other downhole tool telemetry systems to the surface, and with the network of shuttles 160 below, and AC and DC power supplies 154, 156. Each shuttle 160 includes a shuttle module 162. with command and data interfaces as well as AC and DC power supplies 164, 166. Command line signals CMD are implemented on conductors #2, #3, #5 and #6 of the cable using T5 mode transformers. Data line signals DATA, are implemented on conductors #2, #3, #5 and #6 of the cable using T2 mode transformers. Conductors #1 and #4 and the armour are used for power supply along the network. The command line is implemented in a daisy-chained, point to point configuration with re-timing and repeating in each shuttle.

The data line is implemented in daisy-chained, point to point configuration with re-timing and bidirectional data transmission in each shuttle.

The use of logging cable for the bridles offers a number of advantages. Logging cable is essentially cheap and plentiful at the well site which means that bridles can easily be made to measure according to requirements at the well site allowing greater flexibility in inter-shuttle spacing. In fact, the inter-shuttle spacing need not be regular across the array. Furthermore logging cable provides a good electrical power supply path across the array so as to allow faster and more reliable operation of the shuttles. Using mode transformers (e.g. T5 or T7) on the conductors for data communication means that this power can be supplied without compromising data quality or rate.

Figure 4:
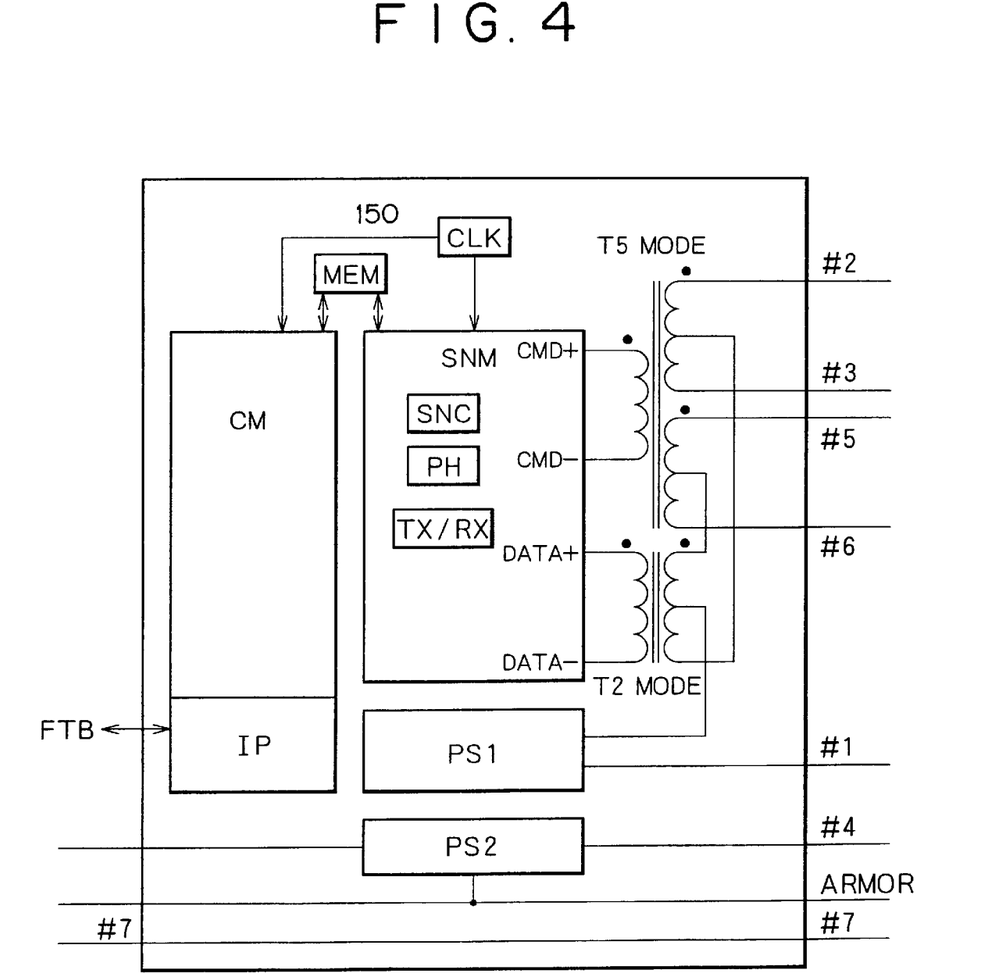
FIG. 4 shows more detail of the cartridge used in the tool of FIG. 2.

FIG. 4 shows the cartridge 150 in more detail. The cartridge connects to the tool bus (FTB) of the tool string by means of an interface package IP which functions in essentially the same manner as the IP found in other downhole tools, and forms part of the controller module CM which communicates with the telemetry system and tool string to send data up hole and receive commands sent down hole from the surface.

The cartridge 150 also includes a sensor network master SNM which transmits and receives command CMD+, CMD− and data DATA+, DATA−signals to and from the network using the logging cable bridles 168 as a signal path. The master SNM includes shuttle network controller SNC functions, a protocol handler PH and transmit/receive TX/RX functions. An AC/DC power supply PS1 provides an electric power source for the cartridge electronics and for the shuttle electronics and sensors. An AC/AC inverter PS2 provides power for motors powering the shuttle anchoring mechanism. Buffer memory MEM is provided for the controller and sensor network master modules CM, SNM and a clock CLK which can be synchronised with a clock in the surface unit via the telemetry system provides time information to the network.

The clock CLK is implemented as an oscillator in a phase locked loop under the control of a dedicated DSP, and outputs a VSI Clock value which is increased incrementally by the action of the oscillator.

Figure 5:
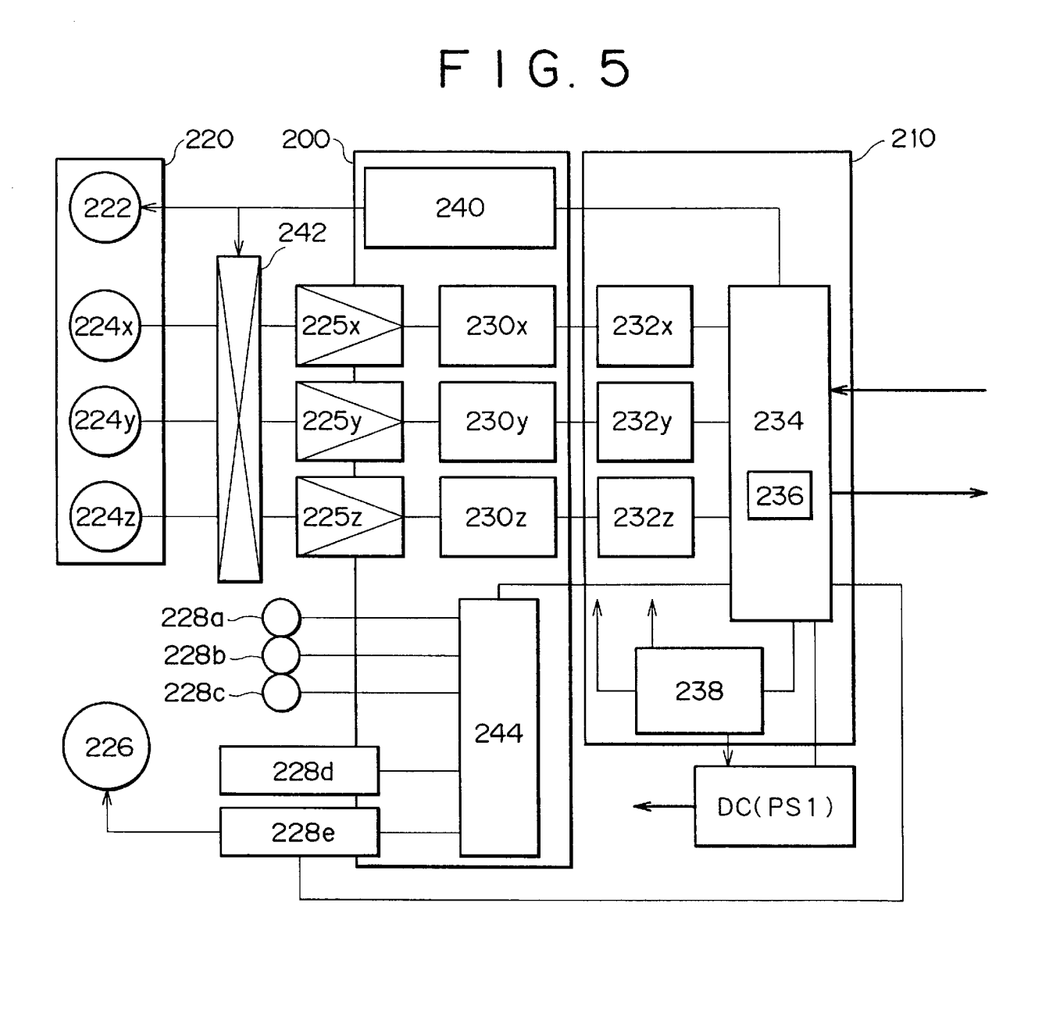
FIG. 5 shows more detail of the shuttle electronics used in the tool of FIG. 2.
Figure 6:
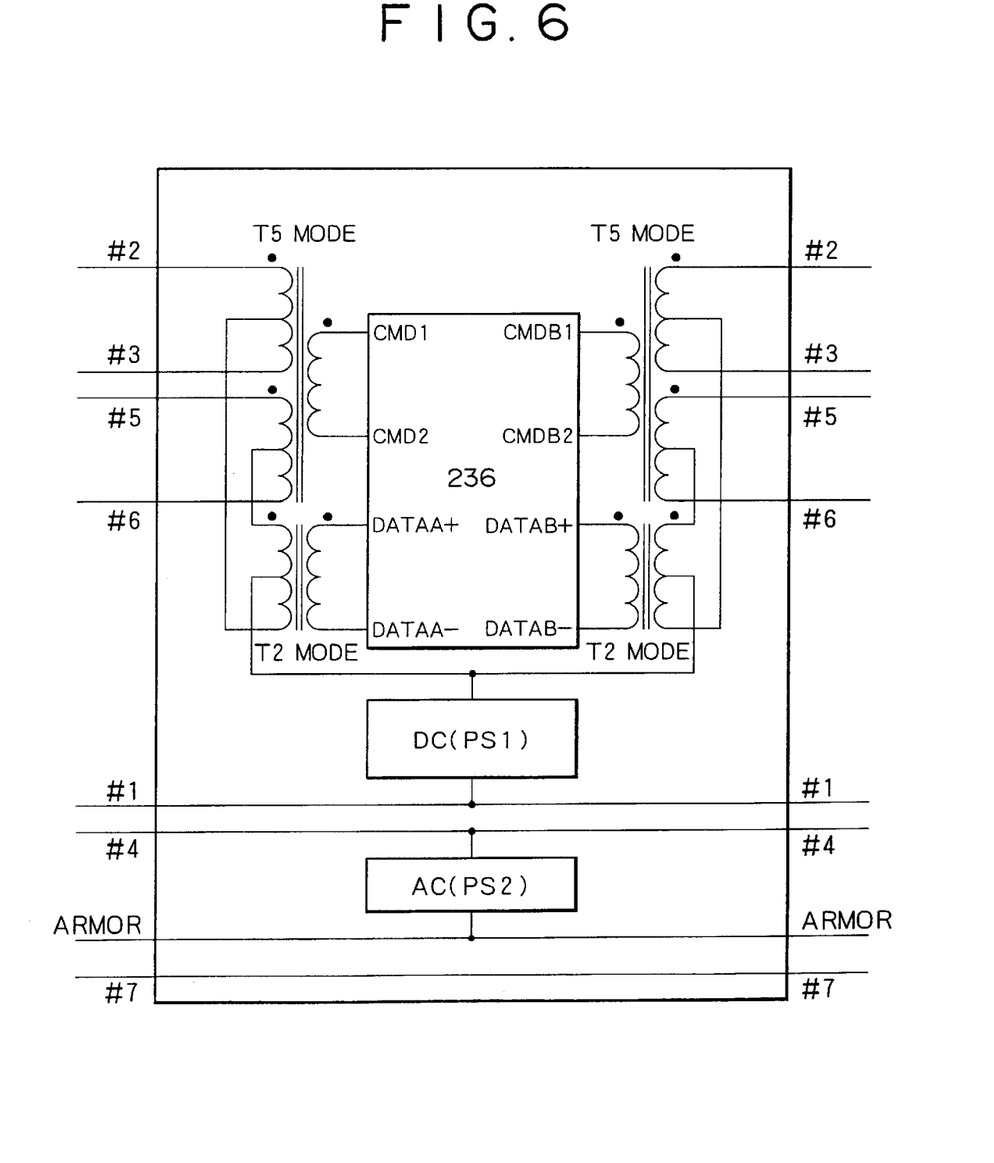
FIG. 6 shows detail of the network interface of the shuttle electronics shown in FIG. 5.

The shuttle electronics are shown in more detail in FIGS. 5 and 6 and comprise two main functional blocks. A front end module 200 handles data acquisition and control at the shuttle level while a back end module 210 handles communication with the shuttle network.

As shown in FIG. 5, the shuttle includes a sensor package 220 which has a shaker 222 and three geophone accelerometers (GAC) 224x, 224y, 224z oriented in orthogonal directions, a motor 226 operating an anchoring arm (not shown) and various other auxiliary functions such as system check sensors (e.g. temperature) 228a, anchoring arm force sensor 228b, anchoring arm clutch position sensor 228c, arm position sensor 228d and anchor motor control 228e.

The output from each GAC 224 is provided to an associated Σ-Δ ADC 230x, 230y, 230z which outputs a digital signal to a respective filter 232x, 232y, 232z in the back end module 210. The outputs of the filters 232 are passed to a shuttle module 234 from where the signals are passed along the network to the cartridge and on to the surface.

The back end module 210 includes a network interface 236 which shows in more detail in FIG. 6 the connections to heptacable conductors #2, #3, #5 and #6 for command signals (CMD1, CMD2, CMDB1, CMDB2) in T5 mode, and data signals (DATAA+, DATAA−, DATAB+, DATAB−) in T2 mode; and to conductors #1, #4, #7 and ARMOR for AC and DC power for shuttle function and motor control (the connections between the network interface and the rest of the back end module are omitted for clarity in FIG. 6).

The back end module 210 not only receives the GAC outputs, it is also provided with a sych/clock recovery function 238 and an output to a test signal generator 240 in the front end module 200. The test signal generator 240 can be used to drive the shaker 222 in the sensor package 220 or applied, via a switch 242, to the GAC signal lines connecting to the pre-amps 225. The back end module 210 also communicates with the auxiliary functions 228 of the front end module 200 via an appropriate A/D converter and front end multiplexer 244.

In use, the tool string is assembled at the surface and if more than one type of tool is present in the string, an array tool such as that described above will typically be the bottom-most tool in the string. Once the array is placed in the well, a signal is sent from the surface to power up the tool, the signal being transmitted along the array of shuttles from the cartridge. On power up, each shuttle registers itself automatically in the network controlled by the cartridge. The network of shuttles then runs completely under control of the control module in the cartridge.

The clock in the cartridge is initially synchronised with the surface telemetry system clock via the digital telemetry system but runs independently of that clock apart from periodic resynchronisation.

Once the network has become active, it acquires data continuously, the GACs in each shuttle recording seismic signals without interruption. This data is time stamped in each shuttle using the network clock, and transmitted over the network to the cartridge where it is stored in the buffer memory. The data in the buffer memory is transmitted back to the surface over the digital telemetry system in the order in which it was received, but independently of the acquisition of the data by the shuttles. Should the buffer become full, newly acquired data overwrites the old data. Because of the provision of the network clock, it is possible to record data continuously and time stamp the data without being reliant on the digital telemetry system. Thus the acquisition of data is relatively independent of the performance of the telemetry system to the surface. The transmission of data to the surface can take place under the control of the digital telemetry system at whatever rate is available without compromising the ability of the array to acquire data at its optimum rate.

Since the sensors become active on power-up, it is possible to use them as descent monitors as the array is lowered into the borehole. The sensors will detect signals due to road noise as the tool is run into the borehole. If the sensors on one or more shuttles stop recording signal, it is an indication that the array is stuck at the sensors in question and running in can be stopped before the bridles or logging cable become tangled.

Once the desired depth is reached, the shuttles are anchored in the borehole by actuation of the anchoring arm mechanism. By measuring the anchoring arm force, the likely quality of data recorded at any given time can be evaluated. If the anchoring force is low, it is possible that the shuttles are not properly anchored to the borehole wall and any data for that period is of suspect quality. Anchoring arm force in one of a number of auxiliary measurements and operations that can be made at each shuttle. These include temperature measurement, anchoring arm clutch position measurement, arm position measurement, anchoring motor operation and shaker operation. Since it is not necessary to have all of these auxiliary functions available at all times, a smaller number of channels are made available for the signals, typically three channels although other numbers of channels may be used depending on availability. Operation of these functions is on a multiplexed basis according to received command signals. Consequently, while seismic data acquisition is on a continuous basis, auxiliary functions are performed on a periodic basis.

When it is desired to move the array to another location in the borehole, a signal is sent from the surface to the cartridge which then passes commands to the shuttles to stop acquiring data and release the anchoring arm for each shuttle. The auxiliary sensors in each shuttle allow confirmation that it has released and the array can be moved to another location where the shuttles can be locked in place again using the anchoring arms. Again the auxiliary sensors allow confirmation of proper deployment of each shuttle before new data acquisition begins.

On startup, each sensor in the shuttles 160 begins acquiring data at a predetermined sampling rate (e.g. 0.5 ms, 1 ms, 2 ms, 4 ms, etc.), which are transmitted to the tool cartridge 150 and stored in the buffer memory MEM. At the beginning of the session, the initial clock value T0 is latched and transmitted to the surface unit 100. At every second FTB frame following this, the clock value is latched and transmitted to the surface unit together with the corresponding value from a clock in the DTC (not shown) which is synchronised with a clock in the surface unit 100. Thus, for an FTB frame length of 16 ms, every 32 ms the surface unit 100 receives a pair of values comprising the VSI clock $t(n)$ and the corresponding DTC time stamp DTS Time Stamp $t(n)$ (which relates to the clock value in the surface unit 100). The sequence is as follows:

1. Startup
2. Latch VSI clock and transmit $t(O)$ to surface. (Begin data acquisition from shuttles an store in buffer with corresponding VSI clock value $t(n)$)
3. Miss one FTB frame.
4. Latch VSI clock and transmit value VSI clock $t(n)$ to surface together with DTC slave clock time stamp, DTS Time Stamp $t(n)$.
5. Miss one FTB frame.
6. Latch VSI clock and transmit value VSI clock $t(n)$ to surface together with DTC slave clock time stamp, DTS Time Stamp $t(n)$.
7. Miss one FTB frame.
8. etc.

In the surface system 100, the latest 256 pairs of VSI clock $t(n)$ and DTS Time Stamp $t(n)$ are accumulated in memory.

When it is desired to retrieve samples of the acquired signals, the clock in the surface system 100 is latched according to the time Te of some event. This can be set internally in the surface system 100 or can be triggered by an external event such as the firing command of a source at the surface or detection of source firing. The surface system translates Te from surface clock time (DTS Time) into VSI clock time using the stored 256 values of VSI clock $t(n)$ and DTS Time Stamp $t(n)$ and simple extrapolation to Te. The time Ts to commence sampling of the data is then computed in terms of VSI clock value which is in phase with the VSI data/time stamp pairs in the buffer MEM. The DTS Time Ts is computed from the extrapolation and used to generate a command signal in the surface system which is transmitted to a surface sensor (if present) and downhole over the telemetry system. This command provides the VSI Ts value and the number of samples to be transmitted uphole. The cartridge uses this command to determine which data are to be retrieved from the buffer MEM and passed to the telemetry cartridge for communication to the surface system 100 over the cable. The sequence is as follows:

1. Latch surface clock to obtain Te
2. Translate Te from DTS time to VSI clock time
3. Compute Ts in VSI clock time from Te
4. Translate Ts from VSI clock time to DTS time and generate command signal
5. Transmit command signal downhole
6. Receive command signal at telemetry cartridge DTC downhole and pass to tool cartridge over FTB
7. Receive FTB command signal in tool cartridge and determine VSI clock time value Ts to start data to be retrieval from buffer and the number of samples to be retrieved
8. Retrieve data and transmit to DTC for communication to surface over cable Using the system described above, it is possible to separate the acquisition of data from the transmission of data to the surface (by the use of the VSI clock) and to only transmit to the surface the data required (by correlating the VSI clock with the surface clock). This optimises use of the telemetry bandwidth by avoiding transmitting unwanted data. While the sampling rate is typically predetermined for the shuttles, it can be adjusted by providing the necessary command signals from the surface.

Because the VSI clock runs independently of the surface clock, it is necessary when determining Te to round its value to the nearest VSI clock value. This rounding varies from case to case by up to one sampling interval (typically 1ms). Since this amount is measurable in the surface system, it can be applied later when the data is analysed. While the invention has been described above in relation to an array seismic tool, it will be apparent that the concept can be applied to other tools either in the form of arrays of similar sensors or strings of different sensors and tools.

What is claimed is:

1. A method of recording data in a borehole logging system which comprises a surface system connected to a downhole system having multiple measuring elements, the method comprising:

i) recording data at each measuring element in a substantially continuous manner;

ii) storing the recorded data in a buffer memory downhole;

iii) determining a data time window and a data sampling rate;

iv) using the determined data time window and data sampling rate to determine data to be retrieved; and v) communicating the data to be retrieved from the memory to the surface system.

2. A method as claimed in claim 1, further comprising associating time stamp data with the recorded data in the memory.

3. A method as claimed in claim 2, wherein there is a clock in the downhole system, the method comprising generating the time stamp data with the clock in the downhole system.

4. A method as claimed in claim 3, wherein there is a clock in the surface system, the method comprising generating a synchronisation signal in the surface system, sending the synchronisation signal to the downhole system, and using the synchronisation signal to synchronise the clock in the downhole system with the clock in the surface system.

5. A method as claimed in claim 4, wherein the clock in the surface system is synchronised with a time signal from a GPS system.

6. A method as claimed in claim 1, comprising communicating the determined time window and sampling rate to the downhole system in a signal from the surface system.

7. A method as claimed in claim 1, comprising determining the time window and sampling rate in response to a detected event.

8. A method as claimed in claim 1, further comprising operating a signal source to generate signals detected by the measuring elements in the downhole system, and transmitting to the surface system data relating to the operating of the signal source.

9. A method as claimed in claim 1, wherein the downhole system includes a downhole telemetry cartridge and a sensor network cartridge, the method comprising storing the recorded data in the sensor network cartridge and communicating the data to the surface via the downhole telemetry cartridge.

10. A method as claimed in claim 1, wherein the downhole system is assembled and connected to the surface system and lowered into the borehole, the method comprising providing power to the downhole system and recording data as the downhole system is lowered into the borehole.

11. A method as claimed in claim 1, further comprising conducting auxiliary operations at the measuring elements on a non-continuous basis and communicating data relating to the auxiliary functions between the surface system and the downhole system on a non-continuous basis.

12. A borehole logging system, comprising:
i) a surface system; and
ii) a downhole system connected to the surface system and including:
a series of measuring elements;
a buffer memory;
means for passing data from the measuring elements to the memory;
means for selecting data in a predetermined time window and at a predetermined sampling rate to be retrieved from the memory; and
means for communicating the data to be retrieved from the memory to the surface system.

13. A borehole seismic logging system, comprising:
i) a surface unit;
ii) a downhole seismic detector array connected to the surface unit and including:
a control module including a memory; and
a series of shuttles, each of which has a sensor, the shuttles being connected to the control module and operating so as to record seismic signals and transmit data to the control module in a substantially continuous manner;
wherein the control module determines data falling within a predetermined time window and sampled at a predetermined sampling rate and communicates the determined data to the surface system.

14. A system as claimed in claim 13, wherein the downhole system is connected to the surface system by means of a logging cable providing a power and data communication path.

15. A system as claimed in claim 13, wherein the downhole array further comprises a telemetry cartridge to which the control module is connected and via which it communicates with the surface system.

16. A system as claimed in claim 13, wherein the downhole seismic detector array includes a clock which provides time data to be associated with seismic signals recorded in the control module memory.

17. A system as claimed in claim 16, wherein the clock is synchronised with a clock in the surface unit by means of control signals sent from the surface unit.

18. A system as claimed in claim 13, further comprising a seismic source, wherein the surface unit receives time signals indicating operation of the source, the time signals being used to determine the time window and the sampling rate.

19. A system as claimed in claim 13, wherein each shuttle includes auxiliary functional elements which operate on a non-continuous basis and data relating to the operation of the auxiliary functional elements passes between the surface unit and the shuttles in a non-continuous manner.

20. A system as claimed in claim 19, wherein a number of channels are available for communication of the data relating to the operation of the auxiliary functional elements, the number of channels being less than the number of auxiliary functional elements and the data being passed over channels via a multiplexer arrangement.

21. A borehole seismic logging tool, comprising:
i) a control module including a memory; and
ii) a series of shuttles, each of which includes a sensor and is connected to the control module such that, when supplied with power, it records seismic signal substantially continuously and transmits the recorded signals to the control module where they are recorded in the memory;
wherein the control module is capable of determining, in response to a signal, data falling within a predetermined time window, to be communicated to a surface system.

22. A tool as claimed in claim 21, wherein the control module is arranged such that when the memory is full, new signals received from the shuttles are overwritten on old data already in the memory.

23. A tool as claimed in claim 22, wherein the control module also includes a clock which provides time data to be associated with the recorded seismic signals.

24. A tool as claimed in claim 23, wherein the control module includes a first controller which can be connected to a surface system and a second controller which controls operation of the shuttles independently of any other borehole logging tools connected to the surface unit.

25. A tool as claimed in claim 21, wherein each shuttle includes auxiliary functional elements which operate on a non-continuous basis and for which data passes between the control unit and the shuttles on a non-continuous basis.

* * * * *